United States Patent

[11] 3,584,553

| [72] | Inventor | Donald M. Harvey |
| | | Rochester, N.Y. |
| [21] | Appl. No. | 773,770 |
| [22] | Filed | Nov. 6, 1968 |
| [45] | Patented | June 15, 1971 |
| [73] | Assignee | Eastman Kodak Company |
| | | Rochester, N.Y. |

[54] FLASHLAMP INDICATOR FOR CAMERAS
2 Claims, 3 Drawing Figs.

[52] U.S. Cl. .................................................. 95/11,
88/1.5
[51] Int. Cl. ....................................................... G03b 17/20
[50] Field of Search ............................................. 95/11, 11
V, 42; 88/1.5

[56] References Cited
UNITED STATES PATENTS
3,391,621 7/1968 Nerwin .......................... 95/11

| 3,416,422 | 12/1968 | Dietrich et al. ............... | 95/11 |
| 3,438,313 | 4/1969 | Topaz ........................... | 95/11 X |

FOREIGN PATENTS

| 441,982 | 1/1968 | Switzerland ................. | 95/11 |

*Primary Examiner*—Samuel S. Matthews
*Assistant Examiner*—Fred L. Braun
*Attorneys*—Robert W. Hampton and John D. Husser ABSTRACT: A device for indicating the presence and used or unused condition of a flashlamp in a camera photoflash station by directing an image of the photoflash station into the field of vision through the camera viewfinder. An opaque member is moved into the light path from the photoflash station to the viewfinder during flashlamp firing so that the bright light from flash exposure does not reach the eye of a camera operator looking in the viewfinder.

PATENTED JUN 15 1971 3,584,553

DONALD M. HARVEY
INVENTOR.

BY *John D. Hussey*
*R.W. Hampton*
ATTORNEYS

FLASHLAMP INDICATOR FOR CAMERAS

BACKGROUND OF THE INVENTION

1. Field of the Invention

The present invention relates to photographic apparatus and in particular to an improved device for indicating the condition and/or presence of a flashlamp on a camera.

2. Description of the Prior Art

In photographic cameras of the type adapted for use in conjunction with photoflash lamps, it is desirable to provide means for conveniently indicating to the camera operator the presence and the used or unused condition of a flashlamp mounted in the camera or flash attachment. The desirability of providing such an indicator has increased considerably with the development of multilamp photoflash units of camera operators frequently forget how many lamps in such units have been used and/or insert multilamp units in which some lamps have been used. Less frequent difficulties occur when a camera operator inadvertently makes an exposure in conditions not requiring flash with a flashlamp operably positioned in the camera or vice versa.

The above-described as well as other considerations demonstrate that a need exists for conveniently, yet relatively assuredly, indicating to the operator the status at the photoflash station of the camera.

Devices have previously been provided which utilize the camera viewfinder as a locale for indicating to the camera operator the condition of the camera photoflash system. Some of these prior art devices provide mechanical indicators which are moved into the field of vision through the camera viewfinder upon insertion of a flash lamp. Devices of this type provide no indication whether an inserted lamp is used or unused.

Other prior art indicator devices provide a light in the camera which is viewable through the viewfinder and indicate the presence of an operable flashlamp in the camera flash system. Such devices require electrical sources, circuitry, and signal lamps and are therefore subject to failure. Of course, such additional elements add to the cost of the camera.

SUMMARY OF THE INVENTION

The present invention is addressed to the above-described problems and involves the provision of an inexpensive system for viewing the photoflash station of the camera through the viewfinder so that the presence or absence and used or unused condition of a lamp at that station can be conveniently checked by the operator during the viewfinding procedure of a picture taking operation. Further, because it would not be desireable to continue viewing of the photoflash station during a flash exposure, the present invention provides means responsive to actuation of the flash exposure to discontinue the viewing of the flash station through the viewfinder during the flash.

It is therefore an object of the present invention to provide an improved flash station indicator for use with photographic apparatus.

A further object of the present invention is to provide a simple and inexpensive device for indicating to the operator, the status of the photoflash station of photographic apparatus.

Yet another object of the present invention is to provide means on a camera for viewing the photoflash station through the camera viewfinder.

Still another object of the present invention is to provide means on a camera allowing viewing of the camera photoflash station through the camera viewfinder yet preventing transmission of the flash light through the viewfinder.

BRIEF DESCRIPTION OF THE DRAWINGS

The above and other objects and advantages of the present invention will become apparent from the detailed description of preferred embodiments of the present invention with reference to the accompanying drawings wherein like numerals denote like parts and in which.

DETAILED DESCRIPTION OF THE PREFERRED EMBODIMENTS

Figure 1:
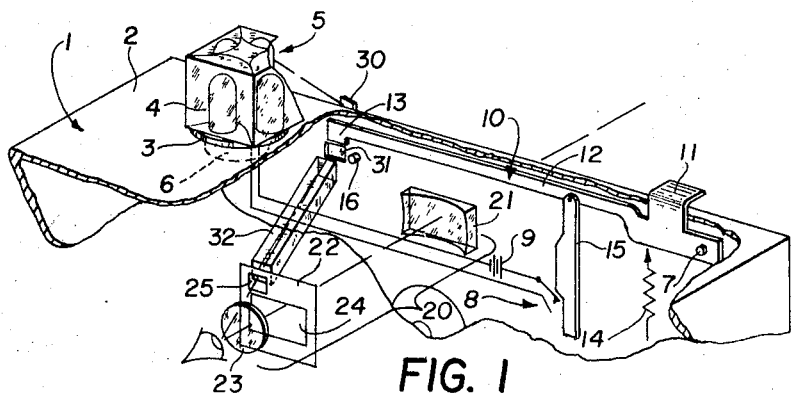
FIG. 1 is a perspective view of a camera showing one embodiment of the present invention in its indicating position and in which certain camera parts have been omitted or fragmented for purpose of illustration.

Referring now to FIG. 1 a photographic camera 1 of a type with which the present invention can be desirably used is shown. Because photographic apparatus of this type are generally known, the present description will be directed in particular to elements forming a part of or cooperating more directly with the present invention, elements not specifically shown or described herein being understood to be selectable from those known in the art.

The camera 1 comprises a casing 2 with a picture-taking aperture and on which is provided a rotatable socket 3 of the type adapted to receive a multilamp photoflash unit 4. The camera can be of the type disclosed in U.S. Pat. No. 3,353,467 having structure such as schematically indicated at 6 for sequentially indexing individual lamps of a received multilamp photoflash unit at a camera photoflash station. The camera is also provided with known structure such as electrical source 9 and switch 8, which are indicated schematically, to fire a lamp at the photoflash station in response to actuation of a picture-taking operation of the camera. The camera photoflash station is indicated by the numeral 5 and is the locus or site of a camera whereat a received lamp is operably oriented to illuminate the scene to be recorded by the camera. It will of course be appreciated that camera flash lamp mounts and attachments different than that shown in FIG. 1 can be used in conjunction with the present invention and that different cameras can have a differently located photoflash station whereat a flash lamp is positioned for flash operation with the particular photographic apparatus; and, it is believed within the scope of one skilled in the art and therefore within the scope of this invention to apply the teachings of the present invention to such differently constructed photographic apparatus.

Also shown in FIG. 1 pivotally mounted to camera casing 2 by pin 7 is a shutter release lever 10. The lever 10 comprises an actuating tab 11 extending outside the casing 2 and a lever arm 12 which has formed on the movable end thereof a shade 13, the purpose of which will be subsequently described. The shutter release lever 10 is biased towards the upward position shown in FIG. 1 by a spring 14 and can be pivoted downwardly by application of pressure on tab 11 to actuate a known camera shutter mechanism (not shown) by means of an arm 15 coupled thereto. A stop 16 limits the downward movement of lever 10.

Also shown in FIG. 1 is a typical camera viewfinder 20 including a negative lens element 21 mounted in the front of the camera casing, a frame 22 and a positive, eyepiece lens element 23. The frame 22 defines scene framing aperture 24 and an indicator framing aperture 25.

Figure 3:
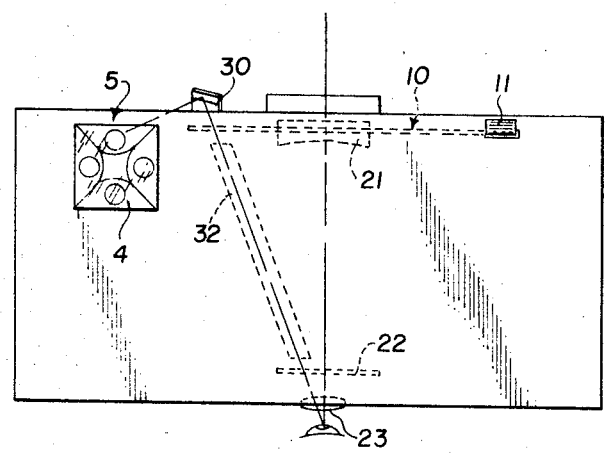
FIG. 3 is a schematic view from the top of the camera shown in FIG. 1 showing the paths of light rays in the present invention.

Referring now to FIGS. 1 and 3 it can be seen that a mirror 30 is mounted on the front of the camera 1 at a position and orientation such that an image of the photoflash station 5 of the camera is reflected towards viewfinder eyepiece 23 through an opening 31 in the front of the camera and the indicator framing aperture 25. In order to improve the transmission within the camera housing of the light image of the photoflash station, a prism or other light conductor, such as a rod, can be provided as shown at 32. The rod 32 has an input surface aligned with and substantially parallel to the opening 31 in the camera front and an output surface aligned with the indicator framing aperture 25 in viewfinder frame 22 so that when shade 13 is not behind opening 31, an image of the camera photoflash station can be viewed through the eyepiece 23 of viewfinder 20. It will of course be appreciated that other analogous light directing systems including various combinations of mirrors, lenses or prisms can be used to provide an image of the photoflash station 5 for viewing through eyepiece 23.

Figure 2:
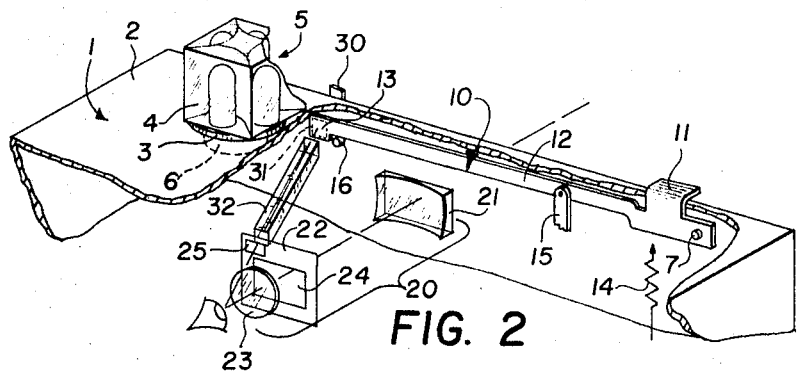
FIG. 2 is a perspective view of the embodiment shown in FIG. 1 but with the present invention in its picture-taking position.

Referring now to FIG. 2 it can be seen that when the camera shutter release lever 10 has been depressed to actuate picture-taking operations of the camera, the shade 13 moves to a position blocking the light image that is normally reflected from mirror 30 towards eyepiece 23. In this manner, the image of the firing flashlamp at photoflash station 5 is prevented from reaching the eye of an operator using the viewfinder. Such a feature is desirable to prevent the temporary but objectionable effects of the extremely bright light in the operators eye. It will of course be appreciated that the function of temporarily preventing the imaging of the flash station in the viewfinder can be accomplished by other mechanism such as, for example, providing a cam or linkage associated with flashlamp actuating structure of the camera to move the mirror 30 or analogous optical elements and thereby change the path of the station image away from the eyepiece 23.

It will now be appreciated that the present invention provides a simple and convenient yet reliable, means for enabling the camera operator to view the camera photoflash station. In this manner the operator can determine, while viewing the scene to be recorded, whether a lamp is in place. Further, since used flashlamps are very distinguishable to the eye from unused lamps, the operator can readily determine whether the lamp positioned at the photoflash station is operable for a flash exposure.

The invention has been described in detail with particular reference to preferred embodiments thereof, but it will be understood that variations and modifications can be effected within the spirit and scope of the invention.

I claim:

1. In combination with a camera of the type having a viewfinder, a photoflash station for placement of photoflashlamps, means for firing a lamp placed at said station and means for actuating said lamp firing means, the improvement comprising:
   a. means for viewing said photoflash station through said viewfinder; and
   b. means, responsive to actuation of said actuating means, for preventing viewing of said photoflash station through said viewfinder during firing of a flashlamp at said station.

2. The invention defined in claim 1 wherein said actuating means includes a shutter release lever of said camera and said means for preventing viewing comprises a substantially opaque member coupled to said shutter release lever and movable into a blocking position in the light path between said photoflash station and said viewfinder.